United States Patent
Cooper et al.

(10) Patent No.: US 7,856,092 B2
(45) Date of Patent: Dec. 21, 2010

(54) METHOD AND APPARATUS FOR HANDLING DISCONNECTED CALL

(75) Inventors: Robert S. Cooper, Columbia, SC (US); Derek Sanders, Columbia, SC (US)

(73) Assignee: Avaya Inc., Basking Ridge, NJ (US)

( * ) Notice: Subject to any disclaimer, the term of this patent is extended or adjusted under 35 U.S.C. 154(b) by 1226 days.

(21) Appl. No.: 11/451,363

(22) Filed: Jun. 13, 2006

(65) Prior Publication Data

US 2007/0286377 A1  Dec. 13, 2007

(51) Int. Cl.
*H04M 3/42* (2006.01)

(52) U.S. Cl. .......................... 379/201.01; 379/201.07; 379/207.02; 379/207.03

(58) Field of Classification Search ............ 379/208.01, 379/201.01, 201.07, 207.02, 207.03, 266.1; 709/203; 455/519, 414.1
See application file for complete search history.

(56) References Cited

U.S. PATENT DOCUMENTS

| | | | |
|---|---|---|---|
| 5,003,577 A | 3/1991 | Ertz | |
| 6,775,358 B1 | 8/2004 | Breitenbach | |
| 7,050,976 B1 | 5/2006 | Packingham | |
| 2002/0146106 A1 | 10/2002 | Himmel | |
| 2004/0235509 A1* | 11/2004 | Burritt et al. | 455/519 |
| 2006/0093100 A1 | 5/2006 | Carlson | |
| 2007/0174386 A1* | 7/2007 | Loghmani | 709/203 |

FOREIGN PATENT DOCUMENTS

WO  WO 03/017629  2/2003

* cited by examiner

*Primary Examiner*—Thjuan K Addy
(74) *Attorney, Agent, or Firm*—Muncy, Geissler, Olds & Lowe, PLLC

(57) ABSTRACT

A method of handling an interrupted call on a communication terminal, which includes updating a task model table including a plurality of informational fields related to a task performed during a call placed on the terminal, and restarting the task at a location corresponding to where the task stopped executing when the call was interrupted using the informational fields in the task model table.

25 Claims, 5 Drawing Sheets

TASK #1 (ID: USER 1)
  TASK TYPE: EMAIL
  DATE: MAY 3, 2005
  START TIME: 08:30:00
  END TIME: 08:31:30
  LIFE EXPECTANCY: 24 HRS

STEP #1: LOAD EMAIL MESSAGE
        FIELD #1: POINTER TO EMAIL MESSAGE
        FIELD #2: NOT CONTINUABLE
        FIELD #3: STATUS COMPLETE
        FIELD #n:

STEP #2: PLAY HEADER
        FIELD #1:
        FIELD #2: NOT CONTINUABLE
        FIELD #3: STATUS COMPLETE
        FIELD #n:

STEP #3: PLAY SUBJECT LINE
        FIELD #1:
        FIELD #2: NOT CONTINUABLE
        FIELD #3: STATUS COMPLETE
        FIELD #n:

STEP #4: PLAY BODY OF EMAIL
        FIELD #1:
        FIELD #2: CONTINUABLE
        FIELD #3: STATUS INCOMPLETE
        FIELD #4: ELAPSED TIME
        FIELD #n:

END TASK #1

TASK #2 (ID: USER 1)
  TASK TYPE: BANK TRANSACTION
     .
     .
     .
END TASK #2
     .
     .
     .
TASK #N (ID: USER X)
  TASK TYPE: CONFERENCE CALL
     .
     .
     .
END TASK #N

FIG. 1

METHOD AND APPARATUS FOR HANDLING DISCONNECTED CALL

BACKGROUND OF THE INVENTION

1. Field of the Invention

The present invention relates to efficiently handling a disconnected call, and more particularly to restarting a task performed during the call at a location where the task stopped executing when the call disconnected.

2. Description of the Related Art

The telephone today is being used for many other services besides merely speaking to another person. For example, a user can use the telephone to listen to emails stored on their home or office computer, to perform different banking transactions, to buy products or services, etc. Regarding a banking transaction, for example, a user can dial their bank's toll free (e.g., 1-800) number and enter their account number and password. The bank system then provides a variety of options that the user can select by entering various commands such as the "1" or "#" key, etc. Thus, the user is required to enter a significant amount of commands or other data to access their bank account information. In addition, a current system allows a user to call into a server and hear emails that are read using a text-to-voice process converter.

However, if the call is disconnected anytime during the call, the user must again call back and start the task completely over. That is, in the email example, if the call is disconnected when the email is being read, the user has to re-listen to the entire email, rather than just the part he or she did not hear due to the disconnection. This type of problem is very inconvenient to the user.

SUMMARY OF THE INVENTION

Accordingly, an object of the present invention is to address the above-noted and other problems.

Another object of the present invention is to provide an efficient method for restarting a task at a location where the task stopped executing when the call disconnected.

To achieve these and other advantages and in accordance with the purpose of the present invention, as embodied and broadly described herein, the present invention according to one aspect provides a method of handling a disconnected call on a communication terminal. The method includes updating a task model table including a plurality of informational fields related to a task performed during a call placed on the terminal, and restarting the task at a location corresponding to where the task stopped executing when the call was interrupted using the informational fields in the task model table.

According to another aspect, the present invention provides a computer program product for executing instructions on a computer to handle an interrupted call on a communication terminal. The computer program product includes a first computer code configured to update a task model table including a plurality of informational fields related to a task performed during a call placed on the terminal, and a second computer code configured to restart the task at a location corresponding to where the task stopped executing when the call was interrupted using the informational fields in the task model table.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, wherein:

FIG. 1 is a task model table illustrating data related to a user listening to his or her email in accordance with an embodiment of the present invention;

DETAILED DESCRIPTION OF PREFERRED EMBODIMENTS

Figure 2:
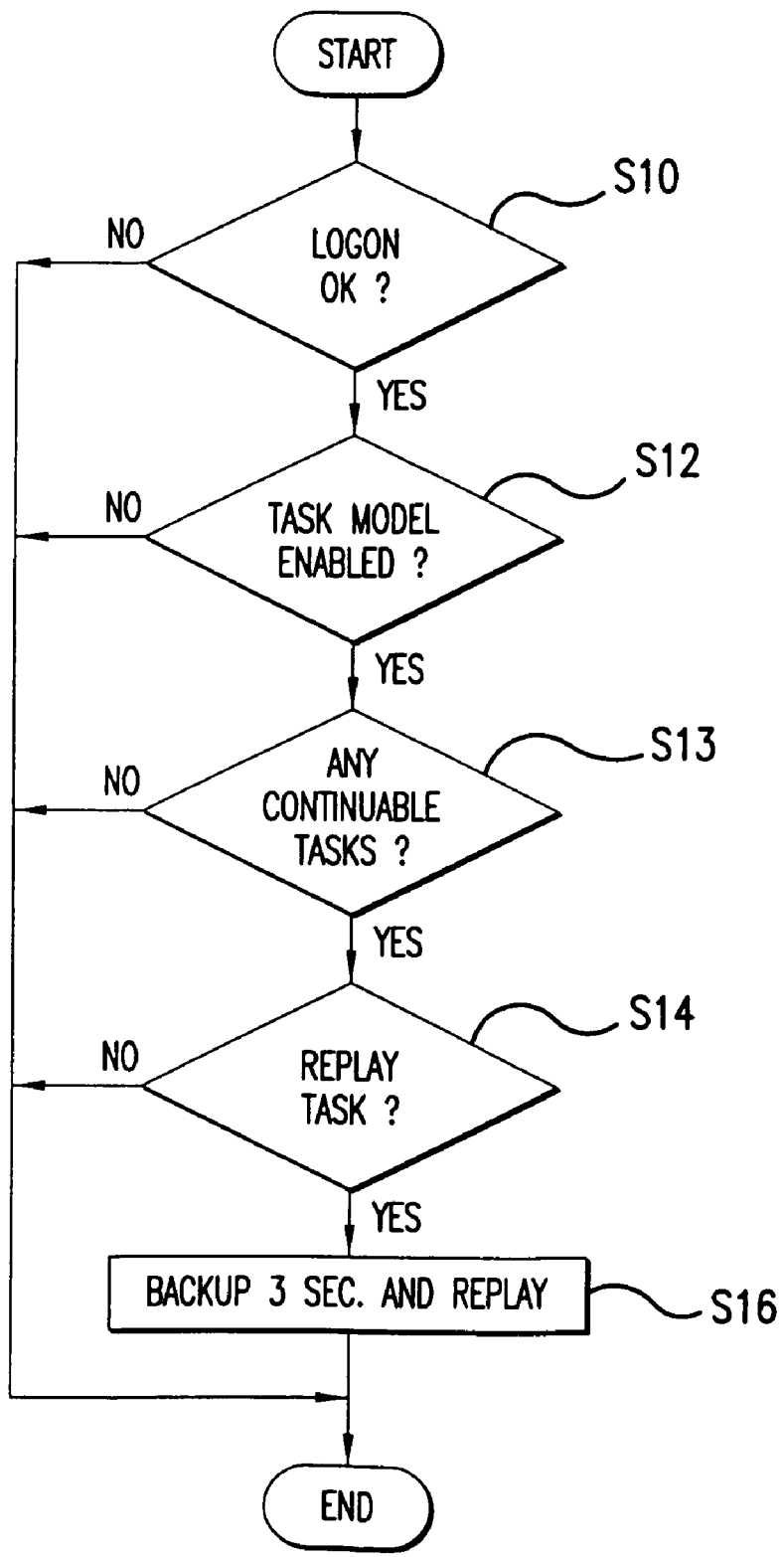
FIG. 2 is flowchart illustrating a method of handling a disconnected call in accordance with an embodiment of the present invention.

Preferred embodiments of the present invention will now be described in detail with reference to the accompanying drawings.

Turning first to FIG. 1, which illustrates a task model table including data related to a user listening to his or her email. Note the task model table may also be used for conference calling, banking transactions, calling contacts, or any other task. Thus, the task model can be a blank table that is actively filled with information corresponding to the executed task.

As shown in FIG. 1, the task model table includes a task #, a task type, a date the task was started, start and end times for the task, a life expectancy time of the task, and a number of steps required to perform the task (e.g., steps 1-4 for task #1 in the example of FIG. 1). Further, each of the step numbers includes a variety of fields related to each step. For example, step #1 in FIG. 1 is related to loading the email message to be played and includes a pointer value pointing to a location in a memory of the email where the email exists (Field #1), a Boolean field indicating whether or not the respective step may be continued or restarted (Field #2), and a status indicating whether or not the loading step has completed (Field #3).

In addition, the task model table may be a fixed table that is applicable to all tasks executed on the terminal or may be a separate table for each task. That is, a separate task model table may be created for an email task, a banking transaction task, etc. FIG. 1 illustrates a task model table that is used to handle all tasks (i.e., tasks #1 ... N).

Thus, in the example in FIG. 1, the Task #1 is for an email process that the user was listening to before the call was disconnected (i.e., the Task type is identified as an email). Further, in this example, there are four steps required to execute the email task. That is, step #1 loads the email, step #2 plays the header of the email, step #3 plays the subject line of the email, and step #4 plays the body of the email.

In addition, steps #2-4 include similar fields as for step #1. However, it is also possible to include different fields for each step depending on how the particular step is executed and what information is needed to restart the step. For example, step #4 in FIG. 1 includes an addition Field #4 not included in steps #1-#3. The Field #4 includes an elapsed time value indicating how much of the email body has been listened to by the user prior to the call being disconnected. In addition, certain Fields may be blank for a particular step indicating the Field is not used for that particular step.

Note also that the task model table in FIG. 1 includes a user ID. Thus, each user has a task model table (i.e., FIG. 1 illustrates the tasks #1 and #2 being assigned to the "user 1" where the task #N is assigned to the "user X"). In more detail, in an example where a system allows a user to call a number to hear their emails, for example, each user calls the same number. Thus, to distinguish between the different users, the task model table includes a field identifying the user. FIG. 1 also illustrates the task model table including a date, start and end time. This information is used to determine when the user first called into the system to hear their email and how long they were on the phone before the call was disconnected.

Turning next to FIG. 2, which illustrates a method of handling a disconnected call in accordance with an embodiment of the present invention. The task model table in FIG. 1 will also be referred to in the description of FIG. 2.

As shown in FIG. 2, after the user first calls into a system that allows them to listen to their emails, listen to a weather forecast, etc. by dialing a telephone number, entering a speed dial key, etc., the user is requested to enter a login ID so the system can identify who the user is (step S10). If the logon procedure is successful (Yes in step S10), the method of the present invention determines whether or not the task model table is enabled for the user (step S12). In more detail, each user sets up their own user preferences on a web page associated with the calling system of the present invention. For example, the user can select the task model table be enabled or disabled. If the task model table is enabled, the information contained in the table is continuously updated when the task is performed. If the user disables the task model table, no information is saved.

Thus, in step S12, the method determines if the task model table is disabled or enabled. If the task model table is disabled (No in step S12), no information is saved. On the contrary, if the task model table is enabled (Yes in step S12), the information has been previously saved and the method determines whether the task model table includes any continuable tasks (step S13). For example, a continuable task includes an email that was interrupted and a non-continuable task includes listening to the weather forecast.

If there is a continuable task or are multiple continuable tasks (Yes in step S13), the method prompts the user to determine if he or she wants to replay the task(s) (step S14) If there are no continuable tasks (No in step S13), the user merely continues performing the task he or she was going to perform. In addition, if there are continuable task(s), and the user selects one of the task(s), the method replays the task at a position (e.g., 3 seconds) before the task was interrupted (step S16). For example, if an email task was interrupted, the email could be restarted at a position 3 second before it was interrupted.

In more detail, and with reference to the task model table shown in FIG. 1, the method of the present invention determines steps #1-3 for the email task were successfully completed and the step #4 was not successfully completed. Thus, in this example, the method retrieves the elapsed time (Field #4 for step #4) indicating how much of the email body was listened to before the call was disconnected. That is, with reference to FIG. 1, the method determines 30 seconds of the email body has already been listened to. Thus, the method would replay the email at a point 3 seconds before the disruption point. The task may be restarted at any time before it was interrupted or at the exact time it was interrupted and 3 seconds is merely an example. The user may also select this variable on his or her preference list.

Figure 3A:
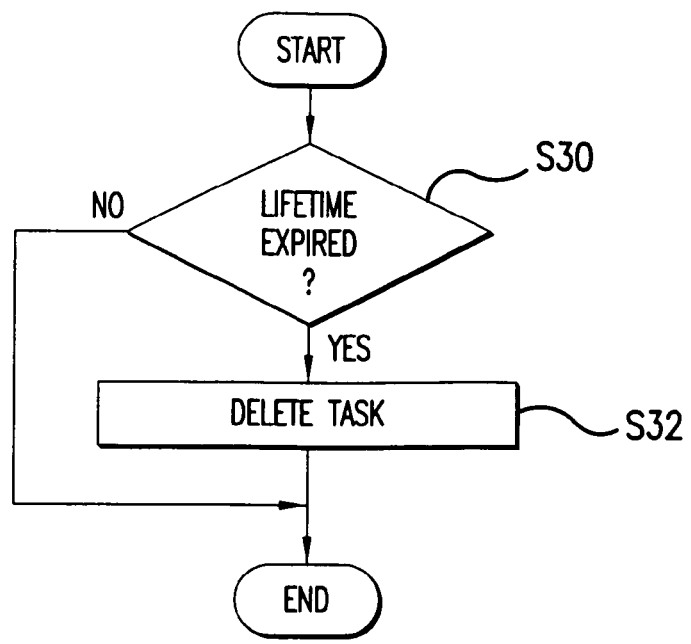
FIG. 3A is a flowchart illustrating a method of deleting tasks that have exceeded their lifetime expectancy in accordance with an embodiment of the present invention.

Turning next to FIG. 3A, which is a flowchart illustrating a process of deleting tasks that exceed their lifetimes. In more detail, the user may set particular lifetime expectancies for each task via the user preference web page. For example, the user may set an email lifetime expectancy as 24 hours. Thus, the email would only be saved in the task model table for 24 hours after the start time of the email.

In more detail, and as shown in FIG. 3A, after steps S10 and S12 in FIG. 2 are successfully passed, the process determines if a particular lifetime expectancy of a task has expired (step S30). For example, the process may review the information stored in the task model table and determine if 24 hours have passed since the start time of a particular task. If 24 hours have passed (Yes in step S30), the fields in the task model table are cleared (step S32). If the time period has not expired (No in step S30), the task is not deleted.

Thus, because the process is performed every time the user calls into the system, the task model table is continuously updated to only include tasks that have not exceeded their lifetime expectancy set by the user. However, the process shown in FIG. 3A may be set to be performed in a batch process such as every evening.

Figure 3B:
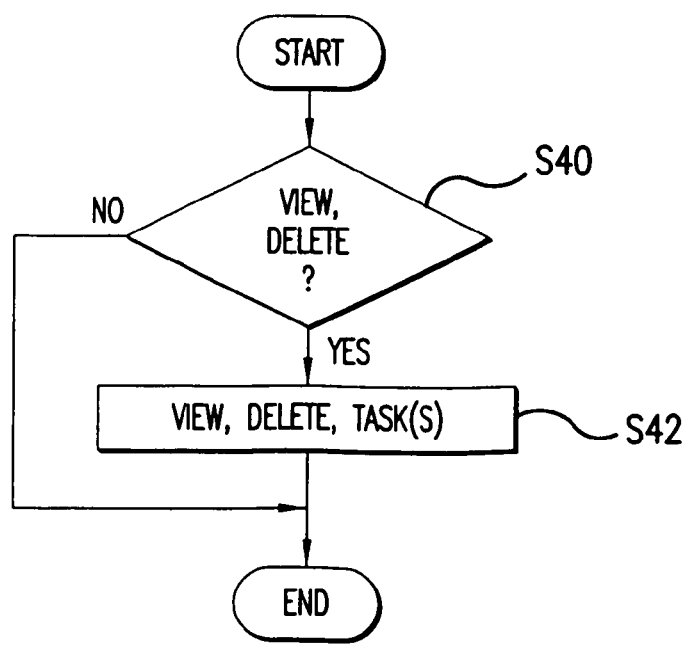
FIG. 3B is a flowchart illustrating a method of allowing a user to view or edit a particular task in accordance with an embodiment of the present invention.

Further, as shown in FIG. 3B, the present invention also provides the user with the capability to view or delete particular tasks. In this example, the user accesses the system via the Internet, for example, and is able to view or delete any tasks contained in the task model table. This process may also be performed by calling into the system. In addition, this process is particularly advantageous in that a person may conduct several different tasks within a two hr period and then go back and review information such as how long the task took, the task type, etc. by viewing the task model table information. Thus, a lawyer who has conducted several transactions may then use the task time information to accurately bill the client at a later date. The user may also delete a task that has not exceeded its lifetime expectancy, but one in which the user wants to delete anyway.

Therefore, as shown in FIG. 3B, when the user logs on to the system, the user is prompted to determine if he or she wants to view or delete particular tasks (step S40). This step may be performed after steps S10 and S12 are successfully completed, or may be performed completely independent of executing a particular task. If the user wants to view or delete a particular task (Yes in step S40), the process displays a list of tasks that are stored in the task model table and performs the requested function on the selected task (step S42).

Figure 4:
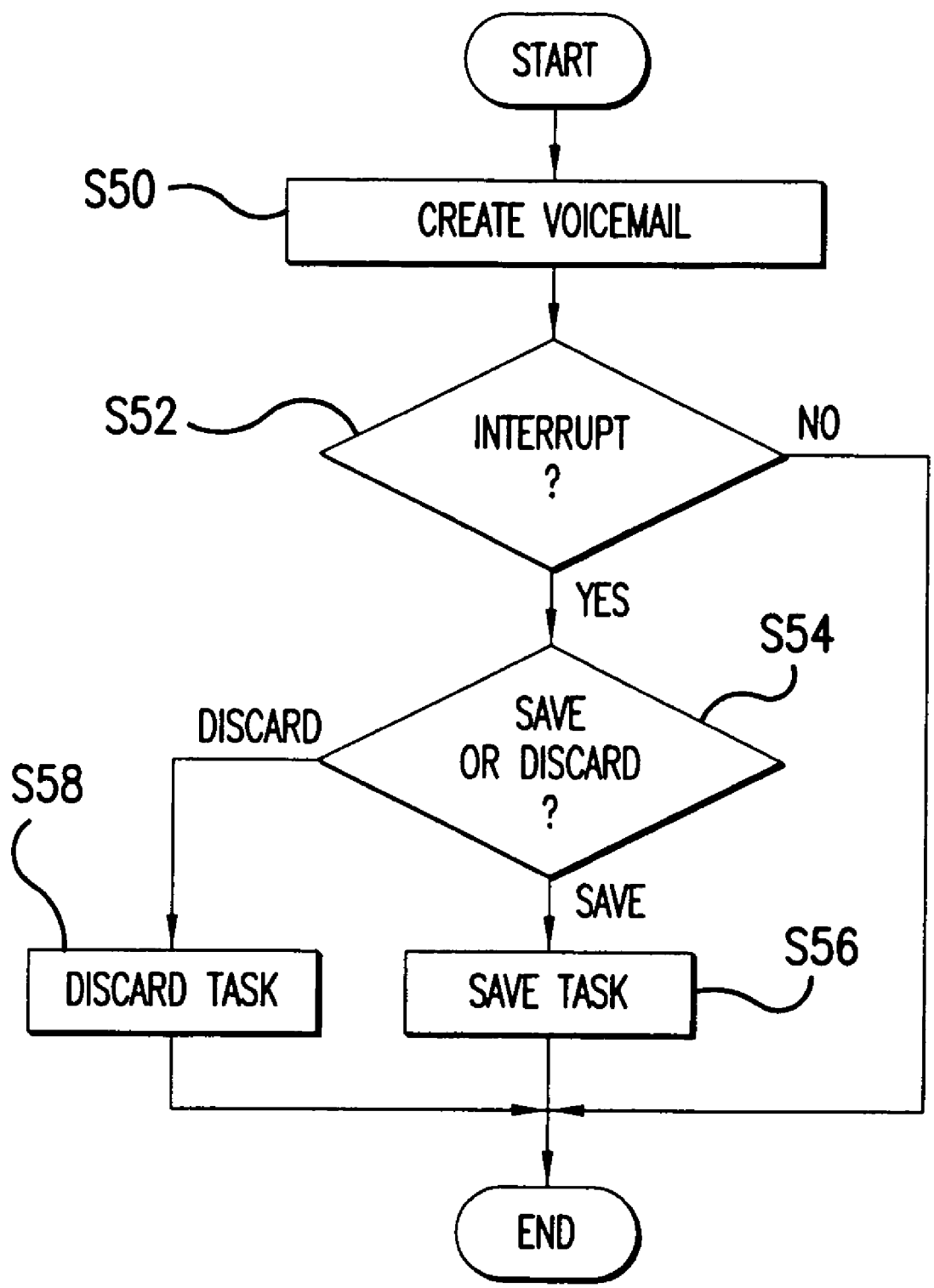
FIG. 4 is a flowchart illustrating a method of allowing a user to interrupt a task in accordance with an embodiment of the present invention.

Turning next to FIG. 4, which is a flowchart illustrating a method of allowing a user to interrupt a task and then restart the task later. Thus, in this method, the user is interrupting the task, rather than the task being interrupted without the user's interaction. This feature is particularly advantageous in that the user may determine after creating a lengthy voice email but before finishing the voice email, he or she would like to listen to what has already been created before transmitting the voice email.

Thus, as shown in FIG. 4, the user first creates the voice mail (step S50), and then requests the task be interrupted by selecting a predetermined key on the phone (step S52). Then, the user is prompted to determine if he or she would like to save or discard the voice email (step S54). If the user selects the email be saved, the email is saved and the task model table is appropriately updated (step S56). Note, in this example, the task model table would indicate that the email was not completed in the appropriate field such that when the user later called into the system, he or she would be informed about the uncompleted task. Alternatively, if the user requested the voice email be discarded, the voice email would be discarded in step S58. In addition, rather than interrupting the call in step S52, the user may simply pause their current transaction. In this instance, the user would be prompted that the transaction was being paused.

Figure 5:
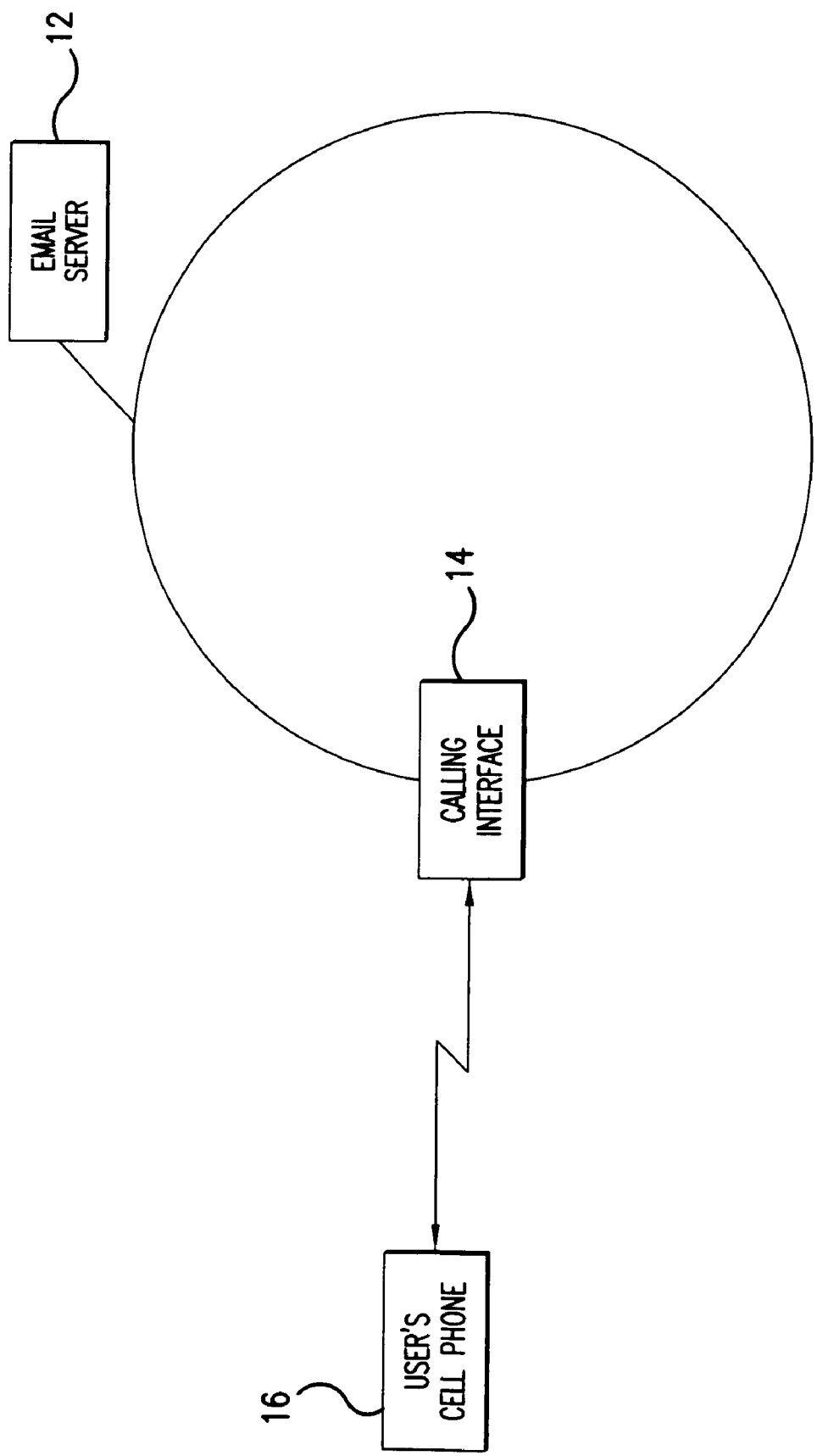
FIG. 5 is an overview of a calling system in accordance with an embodiment of the present invention.

Next, FIG. 5 is an overview illustrating a calling system in accordance with the present invention. In this example, it is assumed the user is calling into his employer's network to listen to emails. As shown, the employer's network generally includes a local area network (LAN) 10, an email server 12 and a calling interface 14. The calling interface 14 allows wireless (or land line) calls to access the LAN 10. For example, the user (i.e., employee) may be away from the office, and call into the employer's network using his or her mobile terminal 16. Thus, assuming the user had previously called into the employer's network to hear an email, which was disconnected, the user could call back into the network and hear the email played back at a point where the email was last disrupted as discussed above. Thus, the user does not have to re-listen to the entire email, but rather can just listen to the part he or she has not yet heard.

Further, the above-noted example illustrates the user listening to an email message via a mobile terminal. However, the use may also be listening to a voice mail, performing bank transactions, setting up a conference call, calling a variety of contacts, ordering products or services, etc. In addition, the task model table shown in FIG. 1 is an example only, and other variations of the table may be used. For example, and as discussed above, a separate table may be used for each specific task.

In addition, the email being read to the user can be accomplished via known speech synthesis techniques that convert the text email into a spoken email.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits whereby interconnecting an appropriate network of conventional computer circuits, as will be readily apparent to those skilled in the art.

Any portion of the present invention implemented on a general purpose digital computer or microprocessor includes a computer program product which is a storage medium including instructions which can be used to program a computer to perform a process of the invention. The storage medium can include, but is not limited to, any type of disk including floppy disk, optical disk, CD-ROMs, and magneto-optical disks, ROMs, RAMs, EPROMs, EEPROMs, magnetic or optical cards, or any type of media suitable for storing electronic instructions.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of handling an interrupted call on a communication terminal, comprising:
   updating a task model table including a plurality of informational fields related to a task performed during a call placed on the terminal; and
   restarting the task at a location corresponding to where the task stopped executing when the call was interrupted using the informational fields in the task model table
   wherein the plurality of informational fields include an identification of a user placing the call, a date of when the task was started, a task number, a task type, a start time the task was started, an end time the task was stopped, a life expectancy of the task, and step numbers related to how many steps are required to execute the task.

2. The method of claim 1, further comprising:
   verifying the identification of the user placing the call.

3. The method of claim 2, further comprising:
   determining if the task model table is enabled or disabled.

4. The method of claim 3, further comprising:
   determining if any tasks in the task model table are continuable when the determining step determines the task model table is enabled.

5. The method of claim 4, further comprising:
   prompting the user to determine if he or she wants to restart a particular task that has stopped executing due the interruption of the call when the determining step determines the particular task is continuable.

6. The method of claim 5, wherein restarting the task restarts the task a location just prior to where the task stopped executing.

7. The method of claim 1, further comprising:
   determining if the life expectancy of the task has expired; and
   erasing the informational fields related to the task from the task model table if the life expectancy has expired.

8. The method of claim 1, further comprising:
   providing options allowing a user to delete or view tasks included in the task model table.

9. The method of claim 1, wherein the task comprises one of an email message, a voice mail message, a bank transaction, and a conference call.

10. The method of claim 1, wherein the call was interrupted due to the user's active intervention.

11. The method of claim 1, wherein the call was interrupted due to conditions not related to the user's active intervention.

12. A computer program product for executing instructions on a computer to handle an interrupted call on a communication terminal, comprising:
   a first computer code configured to update a task model table including a plurality of informational fields related to a task performed during a call placed on the terminal; and
   a second computer code configured to restart the task at a location corresponding to where the task stopped executing when the call was interrupted using the informational fields in the task model table,
   wherein the plurality of informational fields include an identification of a user placing the call, a date of when the task was started, a task number, a task type, a start time the task was started, an end time the task was stopped, a life expectancy of the task, and step numbers related to how many steps are required to execute the task.

13. The computer program product of claim 12, further comprising:
a third computer code configured to verify the identification of the user placing the call.

14. The computer program product of claim 13, further comprising:
a fourth computer code configured to determine if the task model table is enabled or disabled.

15. The computer program product of claim 14, further comprising:
a fifth computer code configured to determine if any tasks in the task model table are continuable when the fourth computer code determines the task model table is enabled.

16. The computer program product of claim 15, further comprising:
a sixth computer code configure to prompt the user to determine if he or she wants to restart a particular task that has stopped executing due the interruption of the call when the fifth computer code determines the particular task is continuable.

17. The computer program product of claim 16, wherein the second computer code restarts the task a location just prior to where the task stopped executing.

18. The computer program product of claim 12, further comprising:
a third computer code configured to determine if the life expectancy of the task has expired; and
a fourth computer code configured to erase the informational fields related to the task from the task model table if the life expectancy has expired.

19. The computer program product of claim 12, further comprising:
a third computer code configured to provide options allowing a user to delete or view tasks included in the task model table.

20. The computer program product of claim 12, wherein the task comprises one of an email message, a voice mail message, a bank transaction, and a conference call.

21. The computer program product of claim 12, wherein the call was interrupted due to the user's active intervention.

22. The computer program product of claim 12, wherein the call was interrupted due to conditions not related to the user's active intervention.

23. The method of claim 1, including determining whether the task is continuable, restarting the task at a location corresponding to where the task stopped executing if the task was determined to be continuable and not restarting the task if the task is determined to not be continuable.

24. A method of handling an interrupted call on a communication terminal, comprising:
updating a task model table including a plurality of informational fields related to a task performed during a call placed on the terminal; and
restarting the task at a location corresponding to where the task stopped executing when the call was interrupted using the informational fields in the task model table,
wherein the plurality of informational fields include an identification of a user placing the call and step numbers related to how many steps are required to execute the task.

25. The method of claim 24, including determining whether the task is continuable, restarting the task at a location corresponding to where the task stopped executing if the task was determined to be continuable and not restarting the task if the task is determined to not be continuable.

* * * * *